US011431668B2

(12) United States Patent
Baughman et al.

(10) Patent No.: US 11,431,668 B2
(45) Date of Patent: *Aug. 30, 2022

(54) DYNAMICALLY MANAGING FIGMENTS IN SOCIAL MEDIA

(71) Applicant: KYNDRYL, INC.

(72) Inventors: Aaron K. Baughman, Cary, NC (US); Christian Eggenberger, Wil (CH); Peter K. Malkin, Ardsley, NY (US); Diwesh Pandey, Bangalore (IN)

(73) Assignee: KYNDRYL, INC., New York, NY (US)

(*) Notice: Subject to any disclaimer, the term of this patent is extended or adjusted under 35 U.S.C. 154(b) by 535 days.

This patent is subject to a terminal disclaimer.

(21) Appl. No.: 16/511,420

(22) Filed: Jul. 15, 2019

(65) Prior Publication Data
US 2019/0340181 A1 Nov. 7, 2019

Related U.S. Application Data

(63) Continuation of application No. 14/937,287, filed on Nov. 10, 2015, now Pat. No. 10,387,433.

(51) Int. Cl.
*G06F 16/2457* (2019.01)
*G06F 16/34* (2019.01)
(Continued)

(52) U.S. Cl.
CPC ............ *H04L 51/52* (2022.05); *G06F 16/345* (2019.01); *H04L 51/02* (2013.01);
(Continued)

(58) Field of Classification Search
None
See application file for complete search history.

(56) References Cited

U.S. PATENT DOCUMENTS 7,599,792 B1  10/2009  Smith
8,756,013 B2  6/2014  Kritt et al.
(Continued)

FOREIGN PATENT DOCUMENTS

WO       2013155529       10/2013

OTHER PUBLICATIONS

Doan-Nguyen H, Kosseim L. The problem of precision in restricted-domain question answering. In Proceedings of the Conference on Question Answering in Restricted Domains Jul. 2004 (pp. 8-15). (Year: 2004).*

(Continued)

*Primary Examiner* — Vincent Gonzales
(74) *Attorney, Agent, or Firm* — Erik Swanson; Andrew M. Calderon; Roberts Calderon Safran & Cole P.C.

(57) ABSTRACT

Systems and methods for dynamically managing figments are disclosed. A computer-implemented method includes: receiving, by a computing device, a question from a user; answering, by the computing device, the question using a first degree figment; classifying, by the computing device, the question based on topics; forwarding, by the computing device, the question to a set of second degree figments; receiving, by the computing device, answers to the question from the set of second degree figments; ranking, by the computing device, the answers received from the set of second degree figments; and providing, by the computing device, the ranked answers to the user.

20 Claims, 8 Drawing Sheets

(51) Int. Cl.
*H04L 51/02* (2022.01)
*H04L 51/52* (2022.01)
*G06N 5/02* (2006.01)
*G06N 3/12* (2006.01)
*H04L 51/216* (2022.01)

(52) U.S. Cl.
CPC ........ *G06F 16/24578* (2019.01); *G06N 3/123* (2013.01); *G06N 5/022* (2013.01); *H04L 51/216* (2022.05)

(56) References Cited

U.S. PATENT DOCUMENTS

| | | | |
|---|---|---|---|
| 8,768,625 | B2 | 7/2014 | Kritt et al. |
| 8,909,643 | B2 | 12/2014 | Ankan et al. |
| 8,972,408 | B1 | 3/2015 | Carpio et al. |
| 2004/0049499 | A1 | 3/2004 | Nomoto et al. |
| 2014/0025734 | A1 | 1/2014 | Griffin |
| 2014/0195547 | A1 | 7/2014 | Albert |
| 2014/0359022 | A1 | 12/2014 | Buddenbaum |
| 2015/0149494 | A1 | 5/2015 | Jason |
| 2017/0132228 | A1 | 5/2017 | Baughman et al. |

OTHER PUBLICATIONS

Seung Hyun Jeon et al., "User Centric Content Management System for Open IPTV Over SNS", IEEE, 2012, 6 pages.

Andre Surcouf et al., "Application of Kolmogorov Complexity To TV Content Similarity", IP.com, Aug. 19, 2014, 9 pages.

Disclosed Anonymously, "Method and Apparatus for Integrating Online Social Media in TV As A Service", IP.com, Jul. 19, 2010, 4 pages.

Mell et al., "The NIST Definition of Cloud Computing", NIST, Special Publication 800-145, Sep. 2011, 7 pages.

Lopez, Vanessa, et al., "Poweraqua: Supporting users in querying and exploring the semantic web" Semantic Web 3.3 (2012):249-265, 17 pages.

Kovachev, Dejan, et al., "Mobile Cloud Computing: A Comparison of Application Models", arXiv preprint arXiv: 1107.4940, 2011, 8 pages.

List of IBM Patents or Patent Applications Treated as Related, Jul. 15, 2019, 1 page.

\* cited by examiner

US 11,431,668 B2

DYNAMICALLY MANAGING FIGMENTS IN SOCIAL MEDIA

BACKGROUND

The present invention relates generally to computer-based question answering and, more particularly, to dynamically managing figments in a question answering system.

When a particular group, workshop, or conference track is created in social media, there is no expert who can summarize the event or provide more insight about the events. People attending and/or monitoring these events usually get most of their information about the event in the form of web portals or blogs that typically do not address all the issues in which an attendee is interested. As such, attendees disadvantageously do not have an automated mechanism by which to ask for and obtain additional information about topics associated with the event.

It is also difficult for a person to keep track of all their posts in social media at such events, and difficult to analyze the impact that a social media post may have in particular groups, workshops, conferences, or meetups. People sometimes face embarrassing moments when they post information which is already outdated or out of the trend, or when they post information which makes negative impact in a user group or society.

SUMMARY

In an aspect of the invention, a computer-implemented method includes: receiving, by a computing device, a question from a user; answering, by the computing device, the question using a first degree figment; classifying, by the computing device, the question based on topics; forwarding, by the computing device, the question to a set of second degree figments; receiving, by the computing device, answers to the question from the set of second degree figments; ranking, by the computing device, the answers received from the set of second degree figments; and providing, by the computing device, the ranked answers to the user.

In another aspect of the invention, there is a computer program product for dynamically managing figments. The computer program product includes a computer readable storage medium having program instructions embodied therewith. The program instructions are executable by a computing device to cause the computing device to: create a first degree figment and a plurality of second degree figments; identify a plurality of topics; determine a respective fitness for each of the plurality of second degree figments for each of the plurality of topics; assign respective routing keys to ones of the plurality of second degree figments based on the determined fitness; receive a question from a user; classify the question using at least one of the plurality of topics; forward the question to a subset of the plurality of second degree figments based on the classifying and the routing keys; receive answers to the question from the subset of the plurality of second degree figments; rank the answers; and provide the ranked answers to the user.

In another aspect of the invention, there is a system for dynamically managing figments. The system includes a CPU, a computer readable memory and a computer readable storage medium associated with a computing device. The system includes: program instructions to receive a natural language question from a user; program instructions to answer the question using a first degree figment; program instructions to classify the question based on topics; program instructions to forward the question to a set of second degree figments; program instructions to receive answers to the question from the set of second degree figments; program instructions to rank the answers received from the set of second degree figments; and program instructions to provide the ranked answers to the user. The program instructions are stored on the computer readable storage medium for execution by the CPU via the computer readable memory. The first degree figment and each of the set of second degree figments determine answers to the question using Question Answering (QA) The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
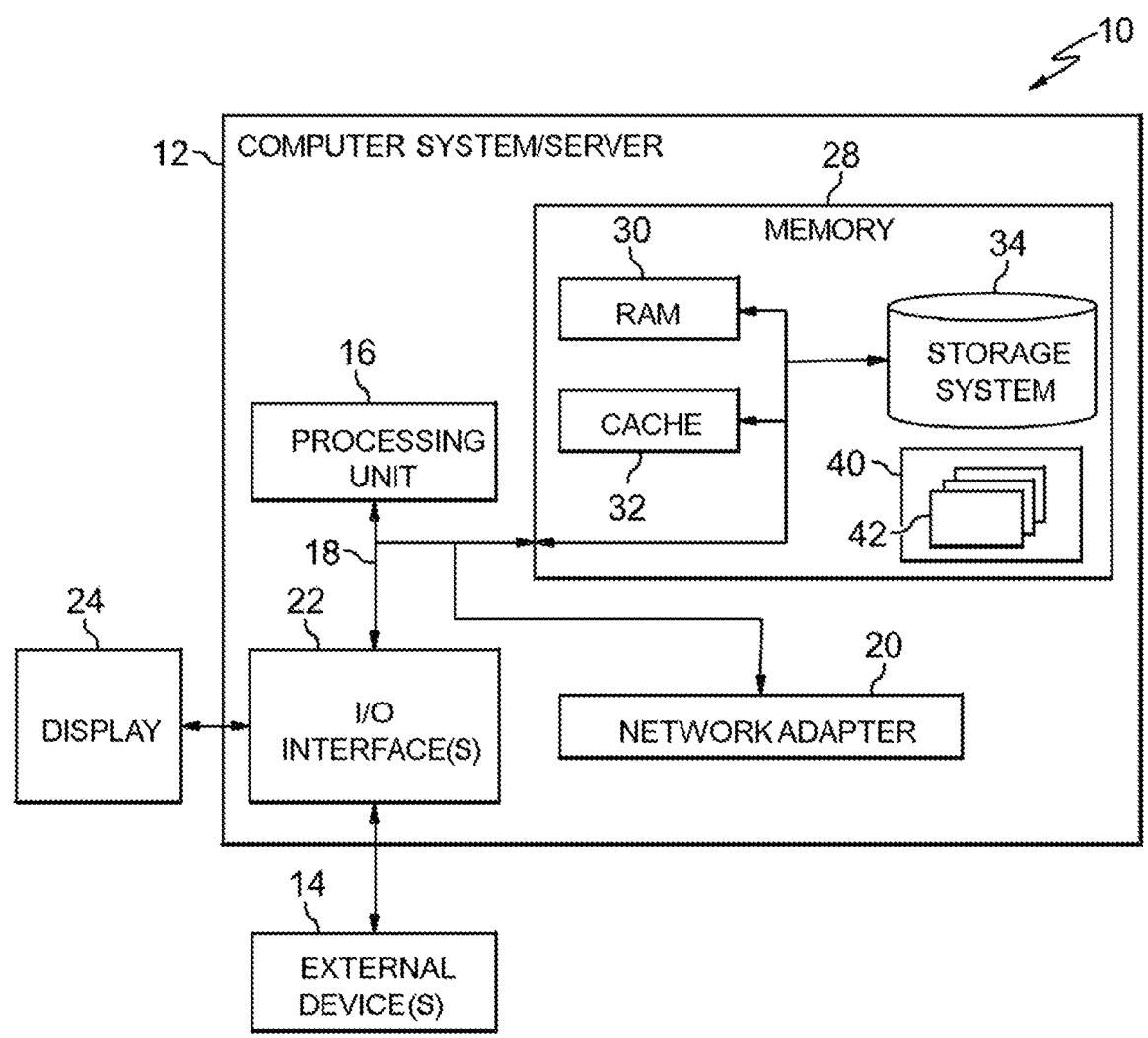
FIG. 1 depicts a cloud computing node according to an embodiment of the present invention.

The present invention relates generally to computer-based question answering and, more particularly, to dynamically managing figments in a question answering system. According to aspects of the invention, a question answering system includes a first degree figment and a plurality of second degree figments. In embodiments, the first degree figment receives a natural language question from a user, classifies the question using routing key(s), routes the question to second degree figments based on the routing key(s), receives answers to the question from the second degree figments, and ranks and returns the answers to the user. In accordance with aspects described herein, the figments may be cloned and teleported to different computing devices. In this manner, different versions of a figment having a same routing key may be used to provide different answers to a natural language question presented by a user.

As used herein, a figment comprises a program module that is executable on a computing device and that is configured to receive a natural language question as an input and provide at least one answer to the question as an output. A figment, as the term is used herein, is part of a natural language question answering (QA) system that does not use prepared answers, but rather determines answers and associated confidence scores that are based on knowledge it has acquired. In embodiments, figments are socially clonable and socially teleportable, as described in greater detail herein.

In embodiments, a first degree figment is trained in a broad manner to cover a wide breadth of topics with relatively less specificity in each of the topics. Second degree figments, on the other hand, are trained in a narrow manner to provide relatively more specificity in a particular topic. For example, the first degree figment may include broad corpora, a broad training answer key, a broad training question set, and a broad ontology, whereas the second degree figments include specific corpora, a specific training answer key, a specific training question set, and a specific ontology. Moreover, in embodiments, the first degree figment is recall oriented (e.g., Re=TP/(TP+FN)), whereas the second degree figments are recall and precision oriented (e.g., Pr=TP/(TP+FP)). In this manner, when compared to one another, the first degree figment is relatively broad and the second degree figments are relatively specific.

In embodiments, the first degree figment attempts to answer a user-submitted question with a satisfactory confidence measure and by using cognitive system question answering. If the first degree figment can answer the question with a satisfactory confidence measure, then the first degree figment returns the answer to the user. On the other hand, if the first degree figment cannot answer the question with a satisfactory confidence measure, then the first degree figment classifies the question using at least one routing key and forwards the question to at least one second degree figment based on the routing key(s). The selected second degree figments then attempt to answer the question using cognitive system question answering. The answer(s) from the second degree figments are returned to the first degree figment, ranked by confidence score by the first degree figment, and provided to the user. In this manner, in the event that the broad first degree figment cannot answer the question with a satisfactory confidence measure, then the question is forwarded to the more specific second degree figment(s) which attempt to provide a more accurate answer than the first degree figment.

According to aspects of the invention, the first degree figment and each of the second degree figments are clonable and teleportable. In embodiments, clonable indicates that a snapshot (e.g., clone) of a particular figment may be copied from an originating computing device to another computing device. The snapshot (i.e., the copied clone) is frozen in a particular configuration (i.e., that at the time of cloning) even though the original figment may change after the cloning (e.g., through further training). In embodiments, teleportable indicates that a particular figment may be copied from an originating computing device to another computing device, where the copy may be altered by training on the other computing device (e.g., using different data than that on which the figment was trained on the originating computing device).

In implementations, cloned figments and teleported figments have the same routing key as the original figment from which they were cloned or teleported. Moreover, cloned figments and teleported figments may be shared amongst a group of users. In this manner, a user in the group of users may ask a question that, based on a routing key, is routed to plural different instances of a second degree figment. The plural different instances may include, for example: a clone of an original second degree figment; the original second degree figment that has changed since the time of cloning (e.g., by further training); and a teleported instance of the second degree figment that has been trained on additional data. Although each of the figments has a same routing key and is based on a common originating figment, each of the figments is different compared to one another and thus may provide different answers to the same question. In this manner, the user is provided access to a question answering system having a broader knowledge base than just the original figment.

In an aspect of the invention, figments are created for groups, conferences, and/or workshops, and second degree figments are spawned for specialized topics within these communities. The figments are usable to help users find out information about a conference track, meetup, or workshop. For example, the groups, conferences, and/or workshops would create figments within communities. The figments summarize the events and spawn second degree figments that specialize within topics (i.e. tracks at a conference). The second degree figments have expertise in particular subject areas. New figments may be created based on user posts or comments in a particular community. Each figment is discoverable through social media. In implementations, a figment at an event is discovered through a provisioned router that is created through openstack, e.g., Infrastructure as a Service (IaaS). All data provided through the router becomes a figment, i.e., content is filtered and modified through the lens of the figment. The figments may be configured to disappear automatically at the conclusion of the event. In embodiments, figments can be cloned and teleported by users so that their clone can remain beyond the event. In this way, the user can maintain ownership of the figment beyond the event and thus continue to use the saved figment on their computing device.

In another aspect of the invention, the cognitive system queries figments to assists users when submitting social media contributions, with the goal of determining whether the planned social media contributions will generate a positive impact or embarrassment to the user. The cognitive system assists the user in recognizing trends and gaps in the user's knowledge by analyzing a vast amount of data. The cognitive system may be employed by the user to validate the planned social media contribution to avoid harm (e.g., embarrassment) to the user or the community. In this manner, the system may be utilized to provide a Personalized Group Expert (PSE) service for posting information in social media and analyzing its impact in the user community.

In embodiments, the PSE service dynamically determines and reports the currently trending topics in a given interest group that are particularly relevant to a given user. The PSE service may also analyze the impact, to the user, of a planned social media contribution. For example, when a user connects to a particular interest group, the user may submit a question to the figments of the system to determine what is happening in the interest group that is most likely to be of interest to the user. The user can also query the figments of the system to ensure that posts made on social media are appropriate. For example, the user may employ the system to ask whether a planned social media contribution will be positively or negatively received by the group, and thus avoid a potentially embarrassing social media post. Moreover, after posting a social media contribution, the system may be used to track and analyze the impact of the contribution. For example, the system may alert the user when the community begins to negatively rate the contribution, and may make recommendations to the user for how best to react to the negative treatment (e.g., a type of answer, reporting abuse, etc.).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
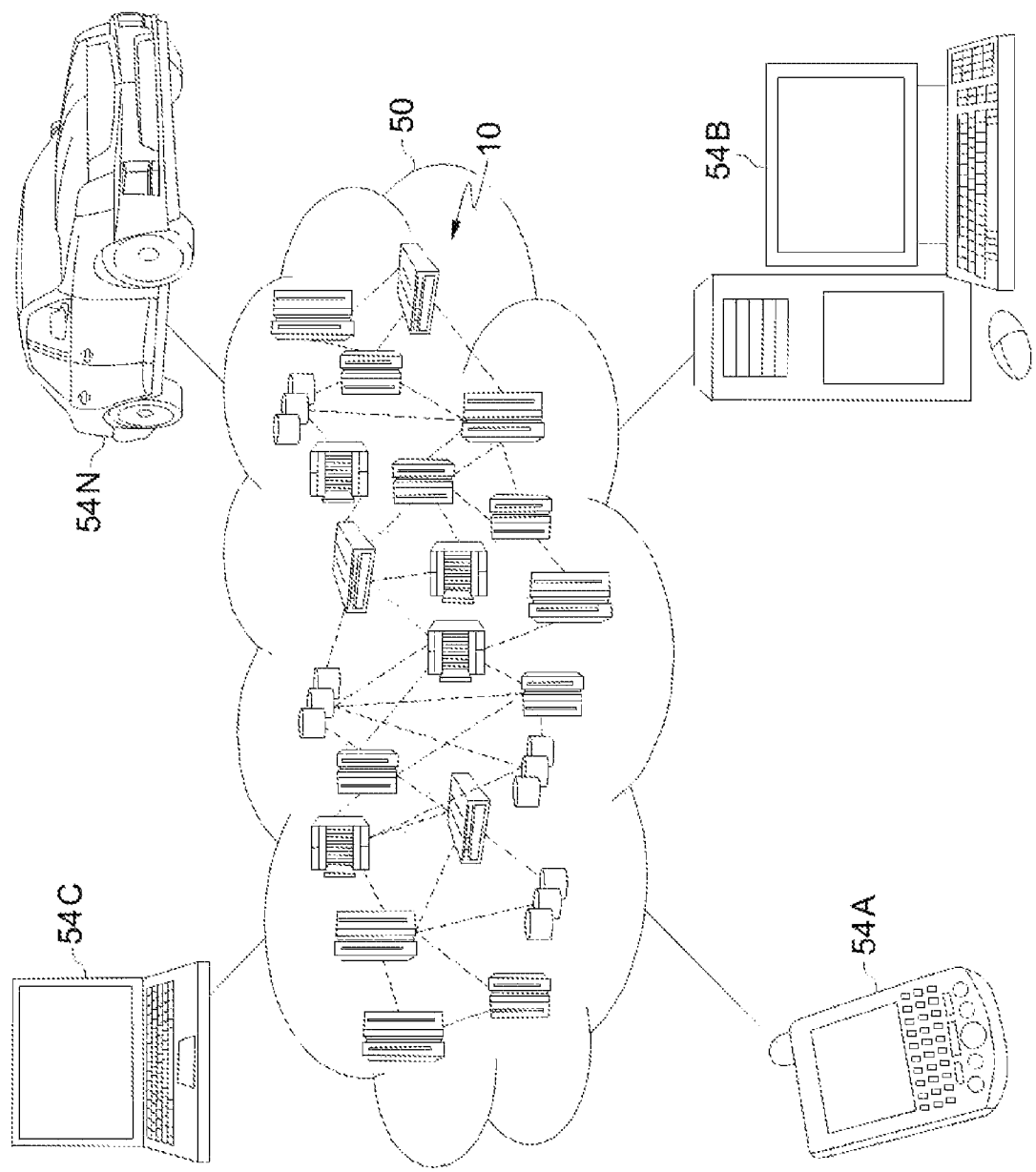
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
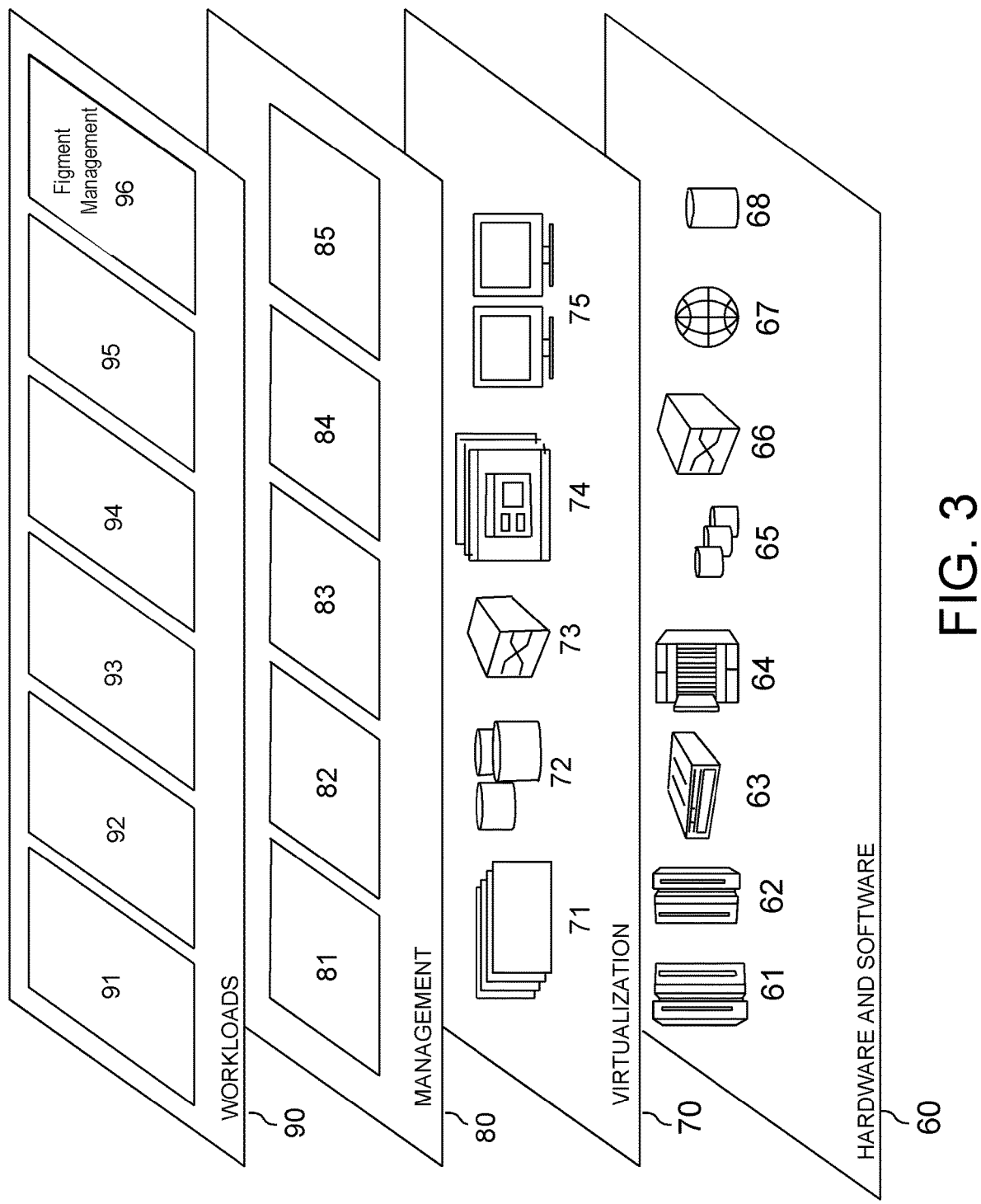
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and figment management 96.

Figure 4:
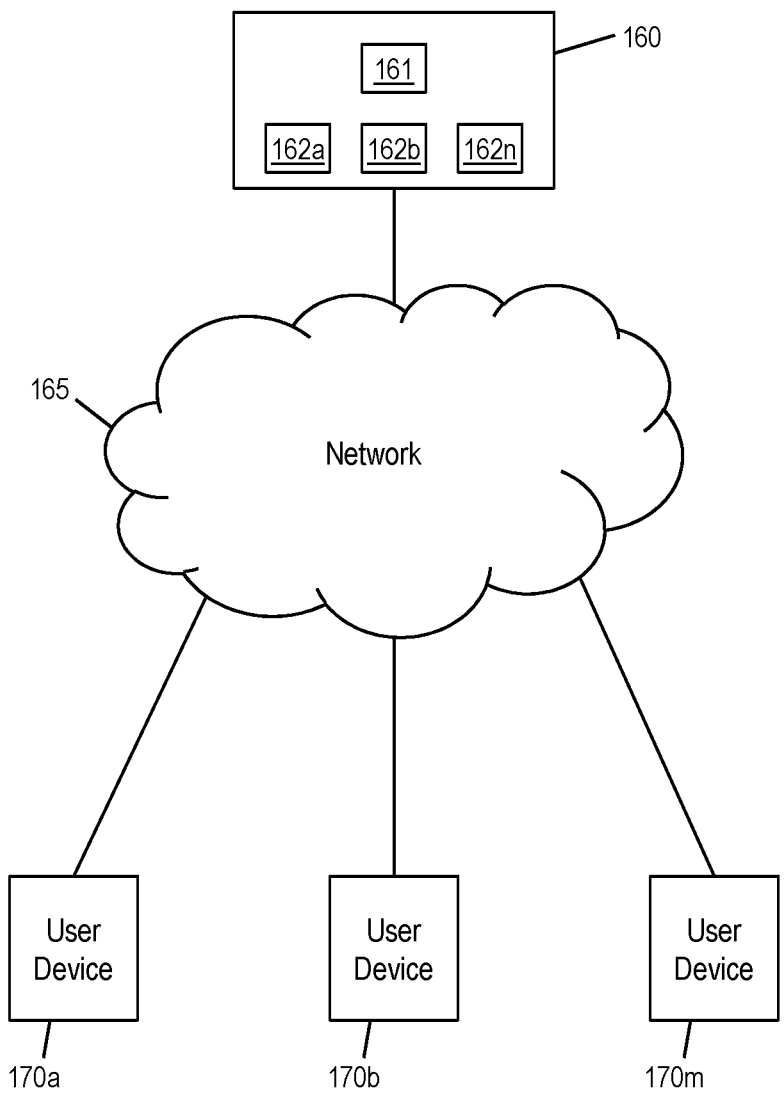
FIGS. 4-6 show computing environments in accordance with aspects of the invention.

FIG. 4 shows a computing environment in accordance with aspects of the invention. In embodiments, the environment comprises a server 160 including a first degree figment 161 and plural second degree figments 162a, 162b, ..., 162n. The server 160 may comprise the computer system/server 12 of FIG. 1, and the each figment 161 and 162a-n may be a program module 42 as shown in FIG. 1.

Still referring to FIG. 4, the environment may also include a network 165 and plural user devices 170a, 170b, ..., 170m. The network 165 may be any suitable communications network such as a LAN, WAN, or the Internet. The user devices 170a-m may comprise any suitable computer devices such as smartphones, tablet computers, laptop computers, desktop computers, etc. In an embodiment, the server 160 and user devices 170*a-m* are nodes in a networked computing environment, e.g., such as nodes 10 in cloud computing environment 50 shown in FIG. 2. There may be any desired number "n" of figments and any desired number "m" of user devices, and "n" can be different than "m".

In embodiments, the figments 161 and 162*a-n* are part of a cognitive question answering system. As such, each user device 170*a-m* may be provided with programming that is configured to permit the user to input a question to the question answering system and receive an answer to the question from the question answering system. For example, each user device 170*a-m* may run a software application that generates an interface by which a user may input a question in natural language form, and that transmits the question to the server 160. Any number of figments may be present on the server 160, with each figment being trained (e.g., using machine learning techniques) with a particular corpora, question set, answer key, and ontology. In a non-limiting illustrative example, the figments 161 and 162*a-n* are generated for a conference, with the first degree figment 161 being trained broadly on a plurality of topics of the conference, and with respective ones of the second degree figment 162*a-n* being specifically trained on one of the plurality of topics of the conference.

According to aspects of the invention, the figments 161 and 162*a-n* are clonable and transportable to the user devices 170*a-m*. For example, the code of figment 162*a* may be copied from the server to the user device 170*b*. FIG. 4 shows the environment at a first time t1 before any cloning or teleporting has occurred.

Figure 5:
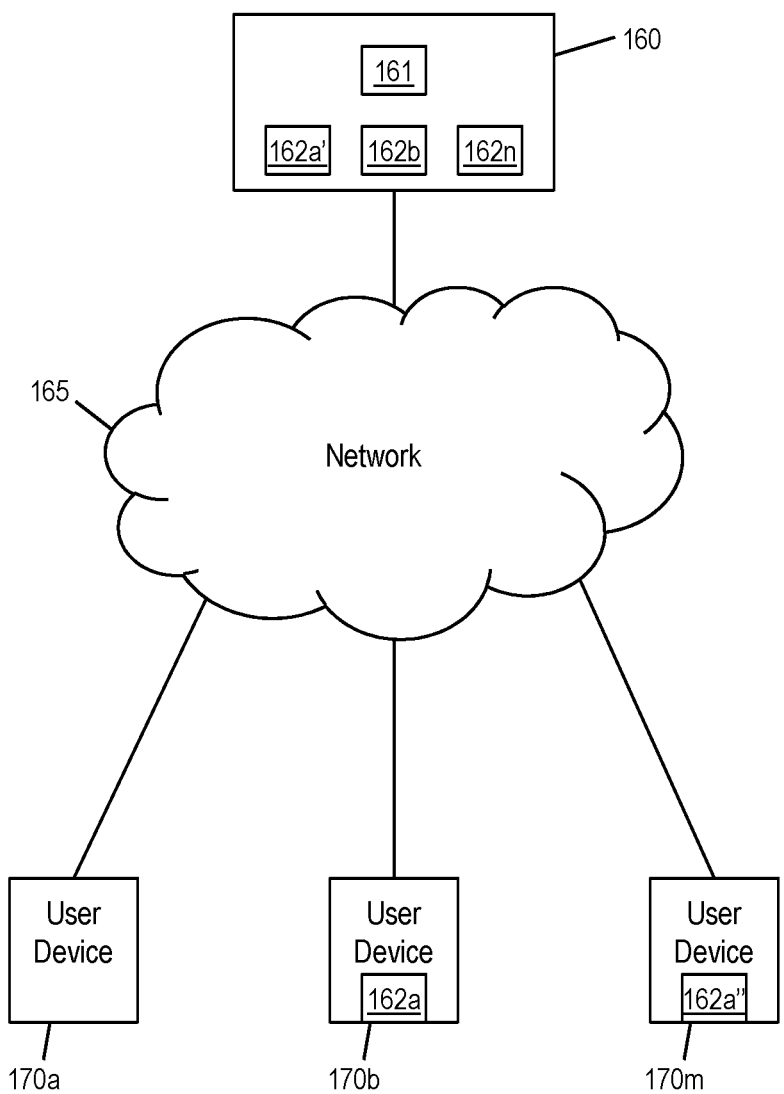

FIG. 5 depicts the environment at a second time t2 after certain ones of the figments have been cloned and teleported. In the example shown in FIG. 5, the figment 162*a* from the server 160 at time t1 (from FIG. 4) has been cloned to user device 170*b*. As shown in FIG. 5 at time t2, the original figment 162*a* on the server 160 has since undergone additional training (after the cloning) and is now figment 162*a*', which differs from cloned figment 162*a* due to the additional training. As further illustrated in FIG. 5, user device 170*m* includes a figment 162*a*" that is a teleported version of the original figment from the server 160 (e.g., figment 162*a* of FIG. 4) and that has been subsequently trained with user data on the user device 170*m*. For example, the figment 162*a*" may have undergone online training with the user's specific corpora that is different than the corpora used to train the original figment 162*a* in FIG. 4. In this manner, the system includes three figments 162*a*, 162*a*', 162*a*" that may be used to provide different answers to a natural language question submitted by a user.

Figure 6:
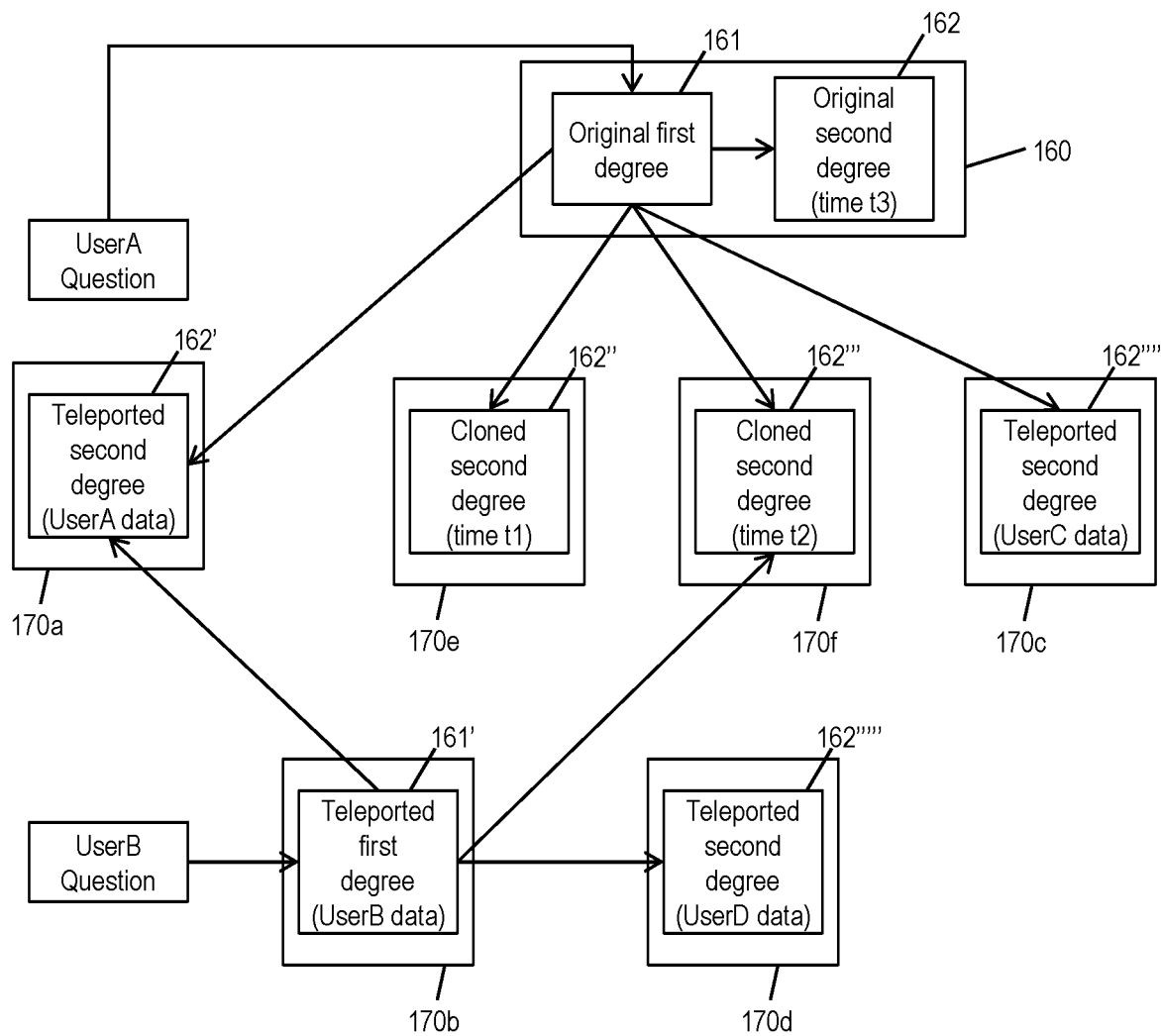

FIG. 6 shows an exemplary use case illustrating aspects of the invention. Specifically, FIG. 6 shows a networked computing environment comprising plural computing devices and plural figments, e.g., similar to that of FIGS. 4 and 5. In this example, a first user (UserA) submits a question via their user device 170*a*. The question is transmitted from the user device 170*a* to the server 160 comprising an original first degree figment 161. In this example, the first degree figment 161 determines that it cannot answer the question with sufficient confidence, and classifies the question using one or more routing keys. The first degree figment 161 identifies second degree figments associated with the determined routing key(s), and forwards the question to the identified second degree figments. In this example, the first degree figment 161 forwards the question to: the original second degree figment 162 on the server 160; a teleported instance of the second degree figment 162' (e.g., trained with UserA data) on user device 170*a*; a cloned instance of the second degree figment 162" (e.g., cloned from the original at time t1) on user device 170*e*; a cloned instance of the second degree figment 162''' (e.g., cloned from the original at time t2) on user device 170*f*; and a teleported instance of the second degree figment 162'''' (e.g., trained with UserC data) on user device 170*c*. Each of the second degree figments 162, 162', 162", 162''', 162'''' attempts to answer the question using QA techniques with their particular corpora, and returns its answers with confidence values to the first degree figment 161. The first degree figment 161 then ranks all the answers from the various second degree figments 162, 162', 162", 162''', 162'''' based on the confidence values, and presents the ranked results back to the user, e.g., by transmitting data to the user device 170*a*.

With continued reference to FIG. 6, in another aspect of the example, UserB submits a question using their user device 170*b*. In this case, the user device 170*b* has a teleported instance of the first degree figment 161' (e.g., trained with UserB data). In this aspect of the example, the teleported first degree figment 161' determines that it cannot answer the question with sufficient confidence, and classifies the question using one or more routing keys. The teleported first degree figment 161' identifies second degree figments associated with the determined routing key(s), and forwards the question to the identified second degree figments. In this example, the teleported first degree figment 161' forwards the question to: a teleported instance of the second degree figment 162' (e.g., trained with UserA data) on user device 170*a*; a cloned instance of the second degree figment 162''' (e.g., cloned from the original at time t2) on user device 170*f*; and a teleported instance of the second degree figment 162'''' (e.g., trained with UserD data) on user device 170*d*. Each of the second degree figments 162', 162', 162,'''' attempts to answer the question using QA techniques with their particular corpora, and returns their answer(s) with confidence values to the teleported first degree figment 161'. The teleported first degree figment 161' then ranks all the answers from the various second degree figments 162', 162''', 162,'''' based on the confidence values, and presents the ranked results back to the user, e.g., by transmitting data to the user device 170*b*.

Still referring to FIG. 6, in another aspect of the invention, the question may be routed to second degree figments based on user a defined sharing configuration in addition to the routing keys. In embodiments, the system is configured to permit a user to specify the identity of other users (or other users devices) to which the first degree figment may forward questions. For example, when determining where to route a question, the first degree figment as an initial matter identifies the user devices that are defined as being within a sharing group. After determining the sharing group of user devices, the first degree figment then determines whether a second degree figment on any of the user devices in the sharing group has a routing key matching the routing key of the question. In this manner, the second degree figments to which a question is routed are determined based on both: a specified group of user devices (e.g., the group of devices registered with the server 160 or specified by a user), and the routing key(s).

Figure 7:
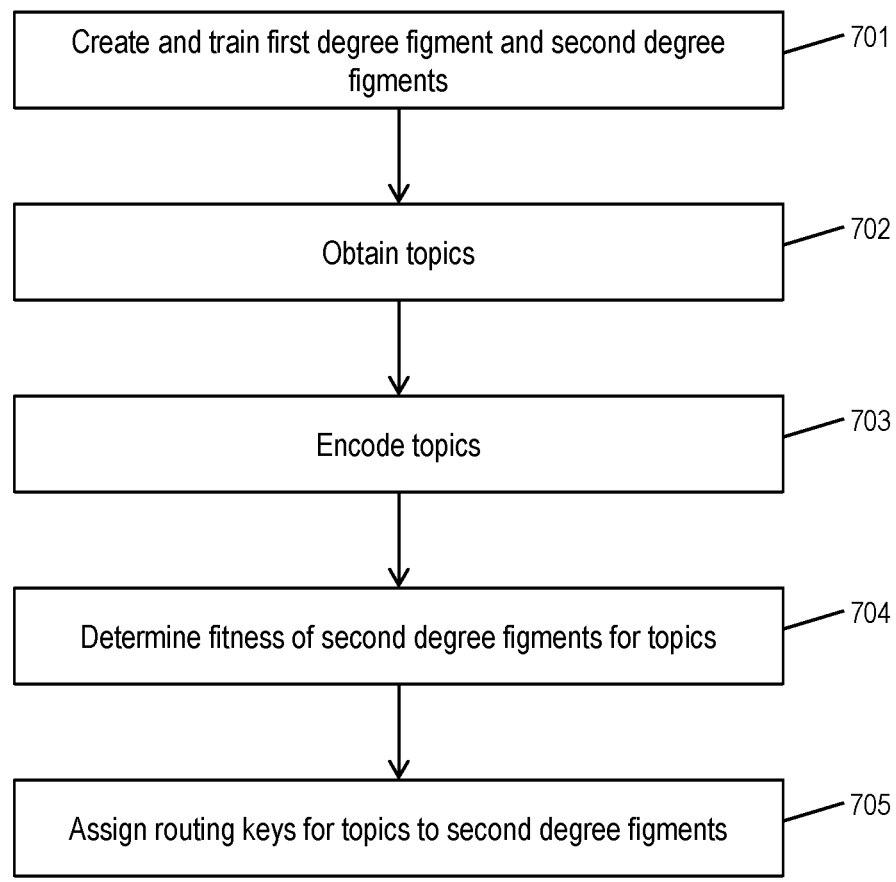
FIGS. 7 and 8 show flowcharts of methods in accordance with aspects of the invention.
Figure 8:
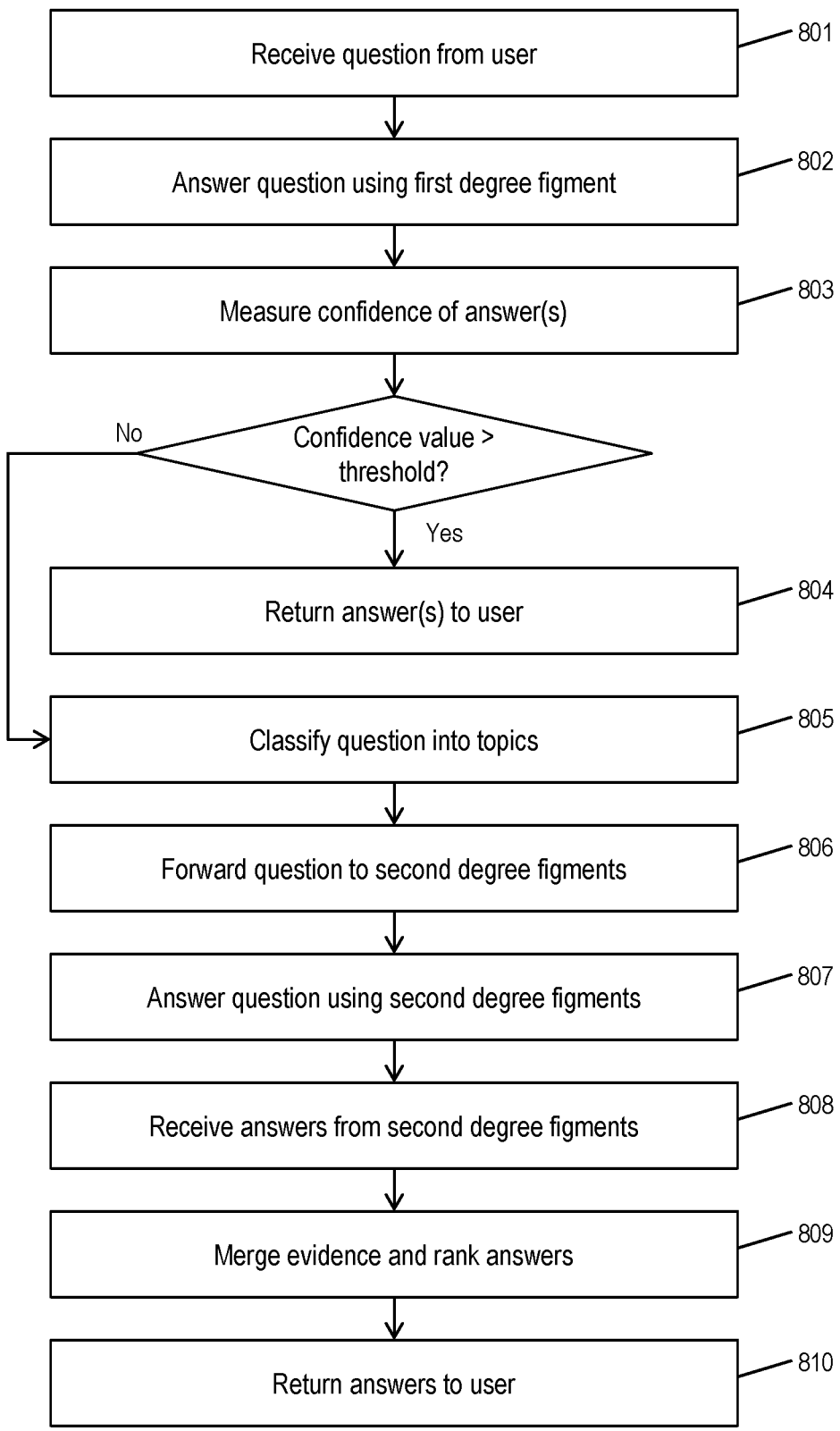

FIGS. 7 and 8 show flowcharts of methods in accordance with aspects of the invention. Steps of the methods of FIGS. 7 and 8 may be performed by devices in the environments illustrated in FIGS. 4-6.

FIG. 7 shows a flowchart of a method of creating and training figments in accordance with aspects of the invention. At step 701, a first degree figment and plural second degree figments are created. In embodiments, each figment is created as a question answering module of a cognitive question answering system, and each figment is trained (e.g., using machine learning techniques) with a particular corpora, question set, answer key, and ontology. In a preferred embodiment, the first degree figment is trained broadly on a plurality of subjects, and respective ones of the second degree figments are specifically trained on one of the plurality of subjects.

At step 702, topics are obtained for indexing the second degree figments. In embodiments the system (e.g., server 60) is provided with a topic crawler program module that determines topics from an information domain. For example, a conference may have a defined information domain, and the topic crawler module may use crawler techniques to index and rank topics in the information domain.

At step 703, the system encodes topics onto chromosomes. In embodiments, each chromosome may be a binary vector of length equal to the combined number of topics obtained at step 702. A value of one (1) at a position in the vector indicates the topic at this position is included in the chromosome, while a value of zero (0) at the position in the vector indicates the topic at this position is excluded from the chromosome. In this manner, each chromosome represents a feature selector with a unique combination of topics from the pool of available topics.

At step 704, the system runs an algorithm to select the topic space. In embodiments, the system uses genetic algorithm techniques with the chromosomes from step 703 to measure the fitness of each second degree figment relative to each topic from step 702. This may include, generally, classifying questions according to the topics, posing the questions to the second degree figments, evaluating the answers of the second degree figments, and using genetic algorithm techniques to determine which second degree figments are most fit for answering questions of a particular topic.

At step 705, the system assigns broker routing keys to each of the second degree figments. In embodiments, for each topic from step 702, the system assigns a unique routing key for the particular topic to the second degree figment(s) determined from step 704 as being most fit to answer questions related to that topic. In accordance with aspects of the invention, the routing keys are used by the first degree figment to identify second degree figments that are most fit for answering a particular question.

FIG. 8 shows a flowchart of a method of using figments in accordance with aspects of the invention. In embodiments, the steps of the method of FIG. 8 are performed using the figments created using the method of FIG. 7. At step 801, the system (e.g., server 60 or user computing device having a first degree figment) receives a question from a user (e.g., from a user device). Step 801 may be performed in the manner described with respect to FIGS. 4-6. The question may be a natural language question. For example, the question may inquire about a subject of a meetup at a conference. As another example, the question may be a social media comment that the user intends to post and is curious how it might be received.

At step 802, the first degree figment attempts to answer the question (from step 801) using cognitive system question answering techniques. At step 803, the system measures the confidence values of the answers provided by the first degree figment. If at least one of the answers from the first degree figment has a confidence value that is greater than a pre-defined threshold value, then the answer is deemed satisfactory and the answer is returned to the user (e.g., transmitted to the user device) at step 804. In the event that no answer from the first degree figment has a confidence value that is greater than the pre-defined threshold value, then the process proceeds to the second degree figments.

At step 805, the system classifies the question into one or more topics. In embodiments, the system uses natural language processing and/or ontology to determine one or more topics from step 702 that are related to the question from step 801. For each topic that is determined at this step as being related to the question, the system assigns the routing key (from step 705) of that topic to the question. A question may be assigned more than one routing key.

At step 806, the forwards the question to at least one second degree figment based on the classification of the question from step 805. In embodiments, the system determines a group of user devices, e.g., as registered with the server or defined by a user. For devices in the determined group, the system identifies second degree figments that have the same routing key as assigned to the question at step 805. The system forwards (e.g. transmits via network) the question to the identified second degree figments, which may include any combination of original second degree figments, cloned second degree figments, and teleported second degree figments.

At step 807, the second degree figments identified at step 806 attempt to answer the question using cognitive system question answering techniques. In embodiments, the second degree figments determine a confidence value for each of their answers.

At step 808, the second degree figments return their determined answers from step 807 to the first degree figment. Each answer may include an associated confidence value.

At step 809, the first degree figment merges the evidence from the second degree figments. In embodiments, combines all the answers from the second degree figments, and creates an ordered list of the answers ranked according to the confidence values from highest to lowest.

At step 810, the system returns the ordered list to the user. For example, the system transmits data defining the ordered list to the user device for display to the user.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for performing one or more of the processes described herein. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a computing device to cause the computing device to:
    receive a question from a user computer device via a network;
    classify the question using a routing key;
    determine a set of second degree figments associated with the routing key from a plurality of second degree figments, including one or more second degree figments located on one or more user computer devices on the network, wherein each of the second degree figments comprises a recall oriented and precision oriented program module configured to receive a question as an input and automatically provide an answer as an output based on knowledge acquired by the recall oriented and precision oriented program module over time;
    forward the question to the set of second degree figments, including the one or more second degree figments located on the one or more user computer devices on the network;
    receive answers to the question from the set of second degree figments;
    rank the answers received from the set of second degree figments;
    create an ordered list of answers based on the ranking; and
    send the ordered list to the user computer device as an answer to the question.

2. The computer program product of claim 1, wherein the program instructions further cause the computing device to answer, by a first degree figment of the computing device, the question, wherein: a confidence value associated with the answer by the first degree figment does not meet a threshold value; and the first degree figment and the plurality of second degree figments are trained using machine learning techniques.

3. The computer program product of claim 1, wherein the set of second degree figments is selected from the group consisting of: an original second degree figment on the computing device; a cloned second degree figment on the one or more user computer devices on the network; a teleported second degree figment on the one or more user computer devices on the network; and a first number of cloned second degree figments and a second number of teleported second degree figments.

4. The computer program product of claim 3, wherein the cloned second degree figment is cloned from an original second degree figment on the computing device and differs from the original second degree figment due to additional training.

5. The computer program product of claim 4, wherein the cloned second degree figment and the original second degree figment are each assigned the same routing key.

6. The computer program product of claim 1, wherein:
    each one of the answers received from the set of second degree figments has an associated confidence measure; and
    the creating the ordered list of the answers is based on the respective confidences measures.

7. The computer program product of claim 1, wherein:
    the question comprises a natural language question; and
    the first degree figment and each of the set of second degree figments determines answers to the question using computer-based Question Answering (QA).

8. A computer-implemented method comprising:
    receiving, by a computing device, a question from a remote user computer device on a network via a network connection;
    classifying, by the computing device, the question using one or more routing keys;
    forwarding, by the computing device, the question to a plurality of second degree figments associated with the one or more routing keys of the question, including at least one of the plurality of second degree figments located at a remote first user device, wherein each of the plurality of second degree figments comprises a recall oriented and precision oriented program module configured to receive a question as an input and automatically provide an answer as an output based on knowledge acquired by the recall oriented and precision oriented program module over time;
    receiving, by the computing device, answers to the question from the plurality of second degree figments;
    ranking, by the computing device, the answers;
    creating, by the computing device, an ordered list of the answers; and
    sending, by the computing device the ordered list of the answers to the user.

9. The computer-implemented method of claim 8, further comprising answering, by a first degree figment of the computing device, the question, wherein: a confidence value associated with the answer by the first degree figment does not meet a threshold value; and the first degree figment and the plurality of second degree figments are trained using machine learning techniques.

10. The computer-implemented method of claim 8, wherein training comprises training with a particular corpora, questions set, answer key and ontology.

11. The computer-implemented method of claim 8, wherein the plurality of second degree figments comprises an original second degree figment on a remote server on the network.

12. The computer-implemented method of claim 8, wherein the plurality of second degree figments comprises a cloned second degree figment on the remote first user device on the network, wherein the cloned second degree figment is a cloned instance of the original second degree figment.

13. The computer-implemented method of claim 12, wherein the cloned second degree figment is differs from the original second degree figment due to additional training, and wherein the original second degree figment and the cloned second degree figment are assigned the same routing key.

14. The computer-implemented method of claim 8, wherein the plurality of second degree figments comprises a teleported second degree figment on a remote second user device on the network, wherein the teleported second degree figment is a teleported instance of the original second degree figment.

15. The computer-implemented method of claim 8, wherein:
each one of the answers received from the plurality of second degree figments has an associated confidence measure; and
the creating the ordered list of the answers is based on the respective confidences measures.

16. The computer-implemented method of claim 15, wherein the plurality of second degree figments are a subset of available second degree figments on the network.

17. A system comprising:
a processor, a computer readable memory and a computer readable storage medium associated with a computing device;
program instructions to receive a question from a remote user computer device on a network via a network connection;
program instructions to classify the question using one or more routing keys;
program instructions to forward the question to a plurality of second degree figments associated with the one or more routing keys of the question, including at least one of the plurality of second degree figments located at a remote first user device, wherein each of the plurality of second degree figments comprises a recall oriented and precision oriented program module configured to receive a question as an input and automatically provide an answer as an output based on knowledge acquired by the recall oriented and precision oriented program module over time;
program instructions to receive answers to the question from the plurality of second degree figments;
program instructions to rank the answers;
program instructions to create an ordered list of the answers; and
program instructions to send the ordered list of the answers to the user,
wherein the program instructions are stored on the computer readable storage medium for execution by the processor via the computer readable memory.

18. The system of claim 17, further comprising program instructions to answer, by a first degree figment of the computing device, the question, wherein: a confidence value associated with the answer by the first degree figment does not meet a threshold value; and
the first degree figment and the plurality of second degree figments are trained using machine learning techniques.

19. The system of claim 18, wherein training comprises training with a particular corpora, questions set, answer key and ontology.

20. The system of claim 17, wherein the plurality of second degree figments are selected from the group consisting of: an original second degree figment on a remote server on the network; a cloned second degree figment on the remote first user device on the network, wherein the cloned second degree figment is a cloned instance of the original second degree figment; a teleported second degree figment on a remote second user device on the network, wherein the teleported second degree figment is a teleported instance of the original second degree figment; and a subset of available second degree figments on the network.

* * * * *